US012407225B2

(12) United States Patent
Barkow et al.

(10) Patent No.: US 12,407,225 B2
(45) Date of Patent: Sep. 2, 2025

(54) DRIVE SYSTEM FOR AN ELECTRIC VEHICLE AND ELECTRIC VEHICLE

(71) Applicant: Dr. Ing. h.c. F. Porsche Aktiengesellschaft, Stuttgart (DE)

(72) Inventors: Maximilian Barkow, Stuttgart (DE); Patrick Fuchs, Leonberg (DE); Sebastian Wachter, Pressig (DE); Daniel Knoblauch, Leonberg (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 249 days.

(21) Appl. No.: 17/727,859

(22) Filed: Apr. 25, 2022

(65) Prior Publication Data

US 2022/0352788 A1  Nov. 3, 2022

(30) Foreign Application Priority Data

Apr. 29, 2021 (DE) ..................... 10 2021 111 088.2

(51) Int. Cl.
*H02K 9/19* (2006.01)
*H02K 11/33* (2016.01)
*B60W 10/08* (2006.01)

(52) U.S. Cl.
CPC ............... *H02K 9/19* (2013.01); *H02K 11/33* (2016.01); *B60W 10/08* (2013.01)

(58) Field of Classification Search
CPC .......... H02K 11/33; H02K 11/30; H02K 9/00; H02K 9/02; H02K 9/04; H02K 9/06;
(Continued)

(56) References Cited

U.S. PATENT DOCUMENTS 10,742,091 B2   8/2020  Honjo
11,440,491 B2   9/2022  Sakabe
(Continued)

FOREIGN PATENT DOCUMENTS

CN   206884725 U    1/2018
DE   102014208499 A1 * 11/2015 ......... H05K 7/20927
(Continued)

OTHER PUBLICATIONS

Nakamura et al, Drive Device, Apr. 2, 2020, WO 2020066955 (English Machine Translation) (Year: 2020).*

(Continued)

*Primary Examiner* — Alexander A Singh
(74) *Attorney, Agent, or Firm* — LEYDIG, VOIT & MAYER, LTD.

(57) ABSTRACT

A drive system for an electric vehicle includes: drive components, including: a traction battery; an inverter; and an electric machine. The traction battery is electrically connected to the electric machine by the inverter. The traction battery is electrically connected to the inverter and the inverter is electrically connected to the electric machine in each case by high-voltage connecting elements. The drive system has a cooling circuit cools the drive components by a cooling medium. The drive components and the high-voltage connecting elements are each formed so as to convey cooling medium and form a part of the cooling circuit.

16 Claims, 4 Drawing Sheets

(58) Field of Classification Search
CPC .. H02K 9/08; H02K 9/10; H02K 9/12; H02K 9/14; H02K 9/16; H02K 9/18; H02K 9/19; H02K 5/203; H02K 7/116; B60W 10/08; Y02T 10/70; B60K 11/02; B60K 1/00
USPC ................ 310/68 R, 52, 54, 58, 64
See application file for complete search history.

(56) References Cited

U.S. PATENT DOCUMENTS

| | | | |
|---|---|---|---|
| 2012/0159986 A1* | 6/2012 | Imanishi | B60L 1/003 62/498 |
| 2020/0353791 A1* | 11/2020 | Sakabe | B60L 58/27 |
| 2021/0178902 A1* | 6/2021 | Liu | H01M 10/6552 |

FOREIGN PATENT DOCUMENTS

| | | |
|---|---|---|
| DE | 102015220852 A1 | 4/2017 |
| DE | 102018004554 A1 | 12/2019 |
| DE | 102019103735 A1 | 8/2020 |
| DE | 102019205466 A1 * | 10/2020 |
| DE | 102019117155 A1 | 12/2020 |
| EP | 2392486 B1 | 4/2018 |
| JP | 2009248920 A | 10/2009 |
| JP | 2010234934 A * | 10/2010 |
| JP | 2011229335 A * | 11/2011 |
| JP | 2019142361 A | 8/2019 |
| JP | 2020183713 A | 11/2020 |
| WO | WO-2020066955 A1 * | 4/2020 |

OTHER PUBLICATIONS

Reichert et al, Cable Sheath for a High-current Cable of a Vehicle, Oct. 22, 2020, DE 102019205466 (English Machine Translation) (Year: 2020).*

Sakaguchi Yoshihiro, Cooling Device, Nov. 10, 2011, JP 2011229335 (English Machine Translation) (Year: 2011).*

Nakajima et al, Electric Vehicle, Oct. 21, 2010, JP 2010234934 (English Machine Translation) (Year: 2010).*

Bohllander Marco, Cooling Circuit with Bypass Flow Path for Cooling an Inverter, Nov. 12, 2015, DE 102014208499 (English Machine Translation) (Year: 2015).*

* cited by examiner

DRIVE SYSTEM FOR AN ELECTRIC VEHICLE AND ELECTRIC VEHICLE

CROSS-REFERENCE TO PRIOR APPLICATION

Priority is claimed to German Patent Application No. DE 10 2021 111 088.2, filed on Apr. 29, 2021, the entire disclosure of which is hereby incorporated by reference herein.

FIELD

The invention relates to a drive system for an electric vehicle.

BACKGROUND

DE 10 2019 205 466 A1 discloses an arrangement of a plurality of electrical vehicle drive components comprising a battery, an electric machine, an inverter and a high-current cable having a cable core for conducting high currents and a coolant channel between the cable sheath and the cable core. The vehicle drive components are connected to a plurality of cooling circuits, which have to be operated for cooling.

DE 10 2019 103 735 A1 discloses a drive system for an electric vehicle having a battery, an inverter and an electric machine. A cooling device is also provided, by means of which the converter and the electric machine can be cooled. Other components are not cooled.

SUMMARY

In an embodiment, the present invention provides a drive system for an electric vehicle, comprising: drive components, comprising: a traction battery; an inverter; and an electric machine, wherein the traction battery is electrically connected to the electric machine by the inverter, wherein the traction battery is electrically connected to the inverter and the inverter is electrically connected to the electric machine in each case by high-voltage connecting elements, wherein the drive system has a cooling circuit configured to cool the drive components by a cooling medium, and wherein the drive components and the high-voltage connecting elements are each configured so as to convey cooling medium and form a part of the cooling circuit.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
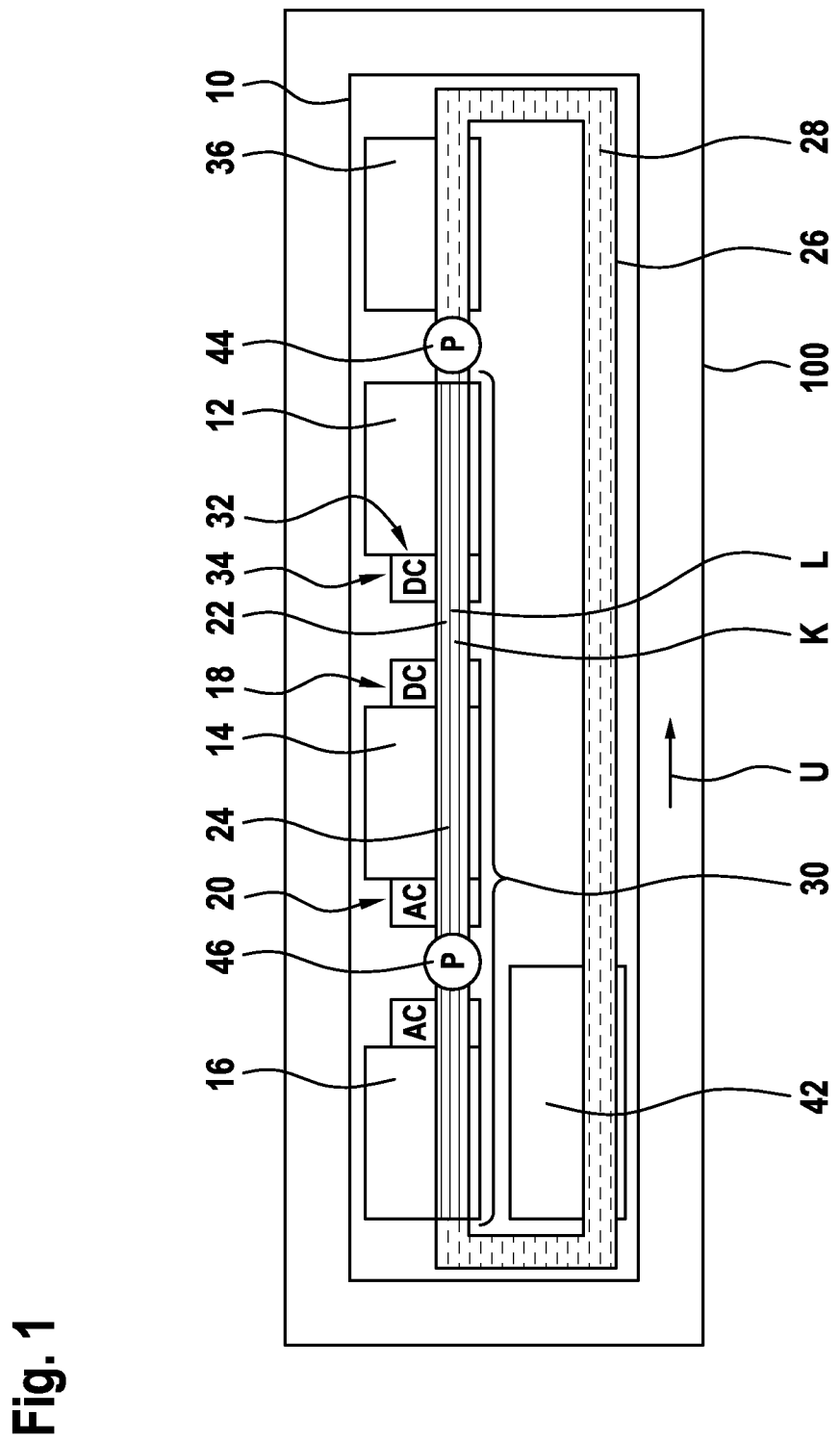
FIG. 1 shows a basic circuit diagram of a drive system.

In an embodiment, the present invention provides a drive system that is improved in relation to the above.

The drive system for an electric vehicle has a traction battery, an inverter and an electric machine as drive components. The traction battery is electrically connected to the electric machine by means of the inverter. In this case, the traction battery is electrically connected to the inverter (DC voltage side) and the inverter is electrically connected to the electric machine (AC voltage side) in each case by means of high-voltage connecting elements. The drive system has a cooling circuit for cooling the drive components by means of a, preferably liquid, cooling medium, wherein the drive components and the high-voltage connecting elements are each formed so as to convey cooling medium and (in their entirety) form at least one part of the cooling circuit.

In other words, the drive components and the high-voltage connecting elements are in each case formed in such a way that they can convey the cooling medium. Specifically, the drive components and the high-voltage connecting elements each have a channel section for conveying the cooling medium. In the assembled state (the drive components and high-voltage connecting elements are coupled to one another), the channel sections form a cooling medium channel and thus a section of the cooling circuit. The current-conducting and power-conducting drive components and high-voltage connecting elements therefore also convey the cooling medium.

In other words, the current-conducting line cores of the drive components and of the high-voltage connecting elements extend next to one another, for example in a parallel arrangement, together with the channel sections for the cooling medium from the traction battery via the electrical high-voltage connecting elements between the traction battery and the inverter, the inverter, the further high-voltage connecting elements between the inverter and the electric machine, and through the electric machine. The cooling path therefore runs together with the current or power path. This contributes to an optimized and uniform cooling of the drive components using simply designed means.

The high-voltage connecting elements are intended to be able to transmit not only high-voltages (for example between 400 and 800 volts), but also high currents (for example between 250 to 600 or 900 amperes). The high-voltage connecting elements could therefore also be referred to as high-current connecting elements.

The electric vehicle is in particular a motor vehicle such as an electrically driven passenger vehicle or commercial vehicle. The drive system is used as a traction drive for the electric vehicle. The inverter may be in particular a pulse inverter. Liquid cooling medium, for example water or oil, can preferably be used as cooling medium.

A charging line, which electrically connects the traction battery to a charging socket (charging socket provided on the electric vehicle), can be connected to the traction battery. The charging line can be connected to the cooling circuit in order to be cooled accordingly.

The high-voltage connecting elements can each preferably be formed as high-voltage lines (single-wire or multi-wire high-voltage cables), plug connectors, busbars or screws. Sufficiently high currents according to the respective requirements can be transmitted hereby.

The high-voltage connecting elements preferably each have a sheathing, which surrounds the outside of the respective high-voltage connecting element, wherein a channel section in which the cooling medium is conveyed is formed in the intermediate space between the sheathing and high-voltage connecting element. In the case of a compact design, large amounts of heat can transmitted hereby.

The drive components and the high-voltage connecting elements preferably each have a connection interface for coupling the drive component to the high-voltage connecting element, wherein the connection interface in each case has an electrical connection (power or current conduction) and a fluid connection (conveying the cooling medium). The electrical connections and the fluid connections are therefore integrated in the connection interfaces. By connecting the connection interfaces, the relevant drive component and the high-voltage connecting element are electrically and fluidically connected to one another.

A portion of the drive components and the high-voltage connecting elements or all of the drive components and high-voltage connecting elements can preferably be formed in such a way that they are able to be cooled or can be cooled by the cooling medium by means of direct cooling. Sections or regions of the drive components and of the high-voltage connecting elements having a particularly high cooling requirement can thus have cooling medium flow around them directly. To this end, sections or regions can be connected in terms of flow to the cooling circuit or to the cooling medium channel.

A heat exchanger or cooler for controlling the temperature of the cooling medium (in the circumferential direction of the cooling circuit or the cooling medium) can preferably be connected upstream of the traction battery in the cooling circuit. As a result thereof, heat can be transmitted between the cooling medium of the cooling circuit and the surroundings of the drive system. It is thus possible for example for heat energy taken up by the cooling medium to be output to the surroundings by means of the heat exchanger.

The drive system can preferably have a gear mechanism which is coupled to the electric machine in particular downstream of the electric machine as a further drive component, wherein the gear mechanism has a gear mechanism heat exchanger and the gear mechanism heat exchanger is integrated in the cooling circuit. The gear mechanism heat exchanger can be connected downstream of the electric machine in the circumferential direction of the cooling circuit or cooling medium. Heated cooling medium can be used to control the temperature of the gear mechanism oil by virtue of the cooling medium of the cooling circuit passing through the gear mechanism heat exchanger. The cooling medium of the entire drive system can output the heat to the gear mechanism oil by means of the gear mechanism heat exchanger. As a result thereof, the efficiency of the gear mechanism can be increased. As an alternative or in addition, the gear mechanism or gear mechanism oil can be cooled by means of the cooling circuit.

The drive system can preferably have at least two inverters, at least two electric machines and at least two gear mechanisms having a gear mechanism heat exchanger, wherein in each case one inverter, one electric machine and one gear mechanism having a gear mechanism heat exchanger are combined to form a drive module. The drive system therefore has two or more drive modules, by way of which for example individual wheel drive can be realized. For example, one to two drive modules for driving a first vehicle axle (for example front axle) and/or one to two drive modules for driving a second vehicle axle (for example rear axle) may be present. The cooling circuit can then, for example after having flown through the traction battery, be divided into two or more substreams, of which each substream flows through a respective drive module. In this case, the substream flows in each case through the inverter, the electric machine and the gear mechanism heat exchanger of the relevant gear mechanism. After passing through the gear mechanism heat exchanger, the two or more substreams of the cooling circuit can be combined to form one stream again. The drive modules can be supplied with energy by way of a common traction battery or have their own battery in each case.

A pump for conveying the cooling medium can preferably be connected upstream of the traction battery in the cooling circuit. It is thus possible to ensure conveying of the cooling medium, for example by raising the pressure level of the cooling medium before the cooling medium enters the traction battery. The pump is connected in particular directly upstream of the traction battery.

A (further) pump for conveying the cooling medium can preferably be connected upstream of the electric machine in the cooling circuit. This also contributes to conveying of the cooling medium being ensured, for example by raising the pressure level of the cooling medium before the cooling medium enters the electric machine. The further pump is connected in particular directly upstream of the electric machine.

The cooling circuit may preferably be the only cooling circuit of the drive system. In other words, the drive components and the electrical high-voltage connecting elements are all integrated in the cooling circuit and are temperature-controlled or cooled by way of said cooling circuit. As a result of the fact that the drive system has only one cooling circuit, the number of component parts and the complexity are reduced.

The cooling circuit can preferably have only one single cooling medium. This contributes to a simplified construction of the cooling circuit and to the reduction of the complexity of the cooling circuit since only one cooling medium has to be provided and conveyed in the cooling circuit.

One, several or all of the drive components can preferably each be fluidically connected to the cooling circuit by means of a controllable switching valve. The respective drive components can thus be connected to the cooling circuit (for example switching valve open) or disconnected from the cooling circuit (for example switching valve closed) depending on the cooling requirement. An optimum and needs-based thermal management for the drive system and the entire vehicle can thus be realized. A bypass line, which is able to be fluidically connected to the cooling circuit, can be provided in each case at the drive components. When the switching valve at one of the drive components is closed, for example, the cooling circuit can then bypass said drive component and for example flow through a drive component which follows in the direction of flow.

One or more heat exchanging devices (heat exchangers or technical auxiliary systems) can preferably be provided, wherein in each case a first side of the heat exchanging device is integrated in the cooling circuit and a second side of the heat exchanging device has a heat output connection for outputting heat energy, in particular to a vehicle interior or the interior of the electrical vehicle. It is therefore possible to advantageously integrate the vehicle interior air-conditioning system in the cooling circuit. For example, the waste heat of the drive system or of one or more drive components can be used to heat the vehicle interior.

An embodiment of a drive system comprises an inverter; an electric machine; a first high-voltage connecting element comprising line cores and a sheathing surrounding an outside of the line cores such that a cooling medium is conveyed by the high-voltage connecting element between the line cores and the sheathing and flows around the line cores directly, the line cores being configured to be cooled by the cooling medium by direct cooling such that the cooling medium directly contacts the line cores; and a second high-voltage connecting element comprising a busbar configured to be cooled by the cooling medium by direct cooling. The first high-voltage connecting element, the inverter, the second high-voltage connecting element, and the electric machine form a contiguous portion of a cooling circuit through which the cooling medium is conveyed from the first high-voltage connecting element to the electric machine. The inverter has a housing with a top closure cover. The inverter has a cooling geometry arranged within the housing and top closure cover. The cooling medium is configured to flow through the cooling geometry. The cooling medium is configured to flow away from the line cores towards the top closure cover. The top closure cover is configured to direct the cooling medium through the cooling geometry toward the second high-voltage connecting element.

The object mentioned in the introduction is also achieved by an electric vehicle having a drive system with one or more of the above-described aspects. With regard to the advantages, reference is made to the statements in this regard concerning the drive system.

The measures described in connection with the drive system and/or still to be explained below serve for the further refinement of the electric vehicle.

Further advantageous configurations will emerge from the following description and the drawing. In the drawing, in each case schematically:

FIG. 1 schematically illustrates a basic circuit diagram of a drive system 10 for an electric vehicle 100. FIG. 1 also indicates the electric vehicle 100, which has such a drive system 10. The drive system 10 is described below.

The drive system 10 has a traction battery 12, an inverter 14 and an electric machine 16 as drive components. The traction battery 12 is electrically connected to the electric machine 16 by means of the inverter 14. The inverter 14 has a DC voltage side 18 and an AC voltage side 20. The traction battery 12 is electrically connected to the inverter 14 and the inverter 14 is electrically connected to the electric machine 16 in each case by means of high-voltage connecting elements 22, 24.

The drive system 10 has a cooling circuit 26 for cooling the drive components by means of a, preferably liquid, cooling medium 28, wherein the drive components (traction battery 12, inverter 14 and electric machine 16) and the high-voltage connecting elements 22, 24 are each formed so as to convey cooling medium and in their entirety form a part 30 of the cooling circuit 26.

The drive components (traction battery 12, inverter 14 and electric machine 16) and the high-voltage connecting elements 22, 24 each have power-conducting or current-conducting line cores L and a channel section K for conducting the cooling medium 28. The line cores L and the channel sections K extend next to one another jointly, in particular parallel to one another, through the traction battery 12, the high-voltage connecting elements 22, the inverter 14, the high-voltage connecting elements 24 and through the electric machine 16.

In the example, the high-voltage connecting elements 22 are formed as multi-wire high-voltage lines (not illustrated). The high-voltage connecting elements 24 can be formed as multi-wire high-voltage lines, plug connectors, busbars or screws (not illustrated).

As already indicated, the high-voltage connecting elements 22, 24 each have a power-conducting or current-conducting line core L and a channel section K for conveying the cooling medium 28. In order to form the channel section K, the high-voltage connecting elements 22, 24 each have a sheathing, which surrounds the outside of the respective high-voltage connecting element 22, 24, wherein a channel section K for the cooling medium 28 (not illustrated) is formed in the intermediate space between the sheathing and the high-voltage connecting element 22, 24 or line core L.

The drive components and the high-voltage connecting elements 22, 24 each have a connection interface 32, 34 for coupling the drive component to the high-voltage connecting element 22, 24 (only shown once in FIG. 1 for the sake of clarity), wherein the connection interface 32, 34 in each case has an electrical connection (power or current conduction) and a fluid connection (conveying the cooling medium 28) (not illustrated).

A portion of the drive components and the high-voltage connecting elements 22, 24 or all of the drive components (traction battery 12, inverter 14 and electric machine 16) and high-voltage connecting elements 22, 24 can preferably be formed in such a way that they are able to be cooled or can be cooled by the cooling medium 28 by means of direct cooling. Sections or regions having a particularly high cooling requirement can thus have cooling medium 28 flow around them directly.

In the example, a cooler or heat exchanger 36 for controlling the temperature of the cooling medium 28 is connected upstream of the traction battery 12 in the cooling circuit 26 in the circumferential direction U of the cooling circuit 26 or the cooling medium 28.

In the example, the drive system 10 can have a gear mechanism 40 (cf. FIG. 2), which is coupled to the electric machine 16 and connected downstream of the electric machine 16, as a further drive component, wherein the gear mechanism 40 has a gear mechanism heat exchanger 42 and the gear mechanism heat exchanger 42 is integrated in the cooling circuit 26 (cf. FIG. 1). In the example, the gear mechanism heat exchanger 42 is connected downstream of the electric machine 16 in the circumferential direction of the cooling circuit 26 or cooling medium 28.

In the example, a pump 44 for conveying the cooling medium 28 is connected upstream, in particular directly connected upstream, of the traction battery 12 in the cooling circuit 26. In the example, a further pump 46 for conveying the cooling medium 28 is connected upstream of the electric machine 16 in the cooling circuit 26.

In the example, the cooling circuit 26 shown is the only cooling circuit of the drive system 10 The drive components (traction battery 12, inverter 14, electric machine 16 and gear mechanism 40) and the electrical high-voltage connecting elements 22, 24 are all integrated in the cooling circuit 26 and are temperature-controlled or cooled accordingly by the cooling circuit 26. In the example, the cooling circuit 26 has only one single cooling medium 28.

Figure 2:
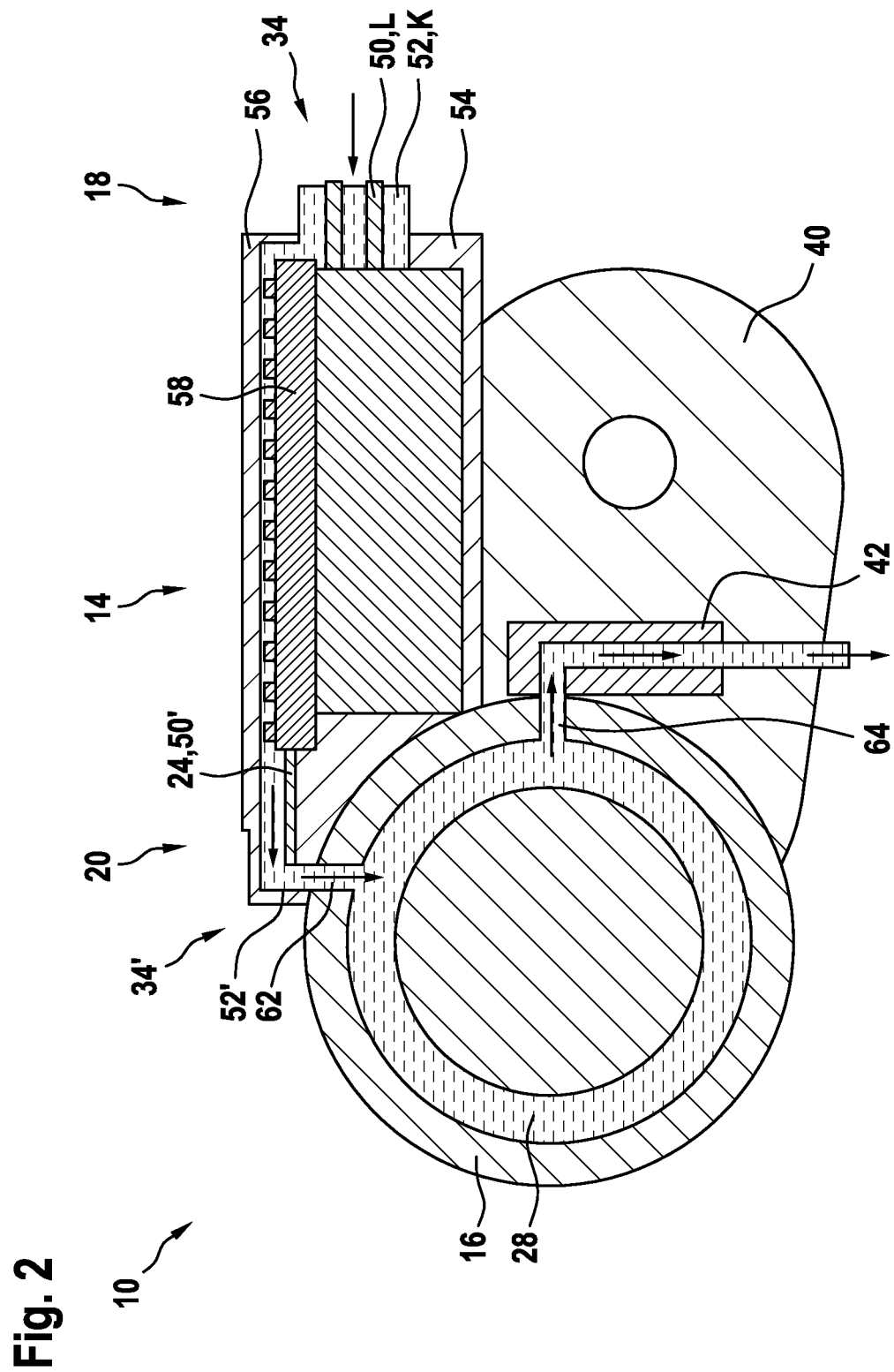
FIG. 2 shows a partly intersected side view of a part of the drive system.

FIG. 2 shows a partially intersected side view of the drive system 10, wherein only the inverter 14, the electric machine 16, the gear mechanism 40 and a section of the cooling circuit 26 are illustrated for the sake of better clarity.

The connection interface 34 is located on the DC voltage side 18 of the inverter 14, wherein the connection interface 34 has in each case an electrical connection 50 or L (power or current conduction) and a fluid connection 52 or K (conveying the cooling medium 28). A further connection interface 34' having an electrical connection 50' and a fluid connection 52' is formed on the AC voltage side 20. The high-voltage connecting elements 24 are formed at the electrical connection 50', for example by means of busbars. The cooling medium 28 is transferred to the electric machine 16 at the fluid connection 52'.

The inverter 14 has a housing 54 having a top closure cover 56. A cooling geometry 58, for example for a carrier plate and/or electrical components of the active parts 60 of the inverter 14, through which cooling geometry the cooling medium 28 flows, is arranged within the housing 54.

The electric machine 16 likewise has cooling medium 28 flowing through it, which cooling medium enters the electric machine 16 at an input 62 and leaves the electric machine 16 at an output 64. The electric machine 16 can have a stator cooling system, for example a direct stator cooling system. After leaving the output 64, the cooling medium 28 flows through the gear mechanism heat exchanger 42.

Figure 3:
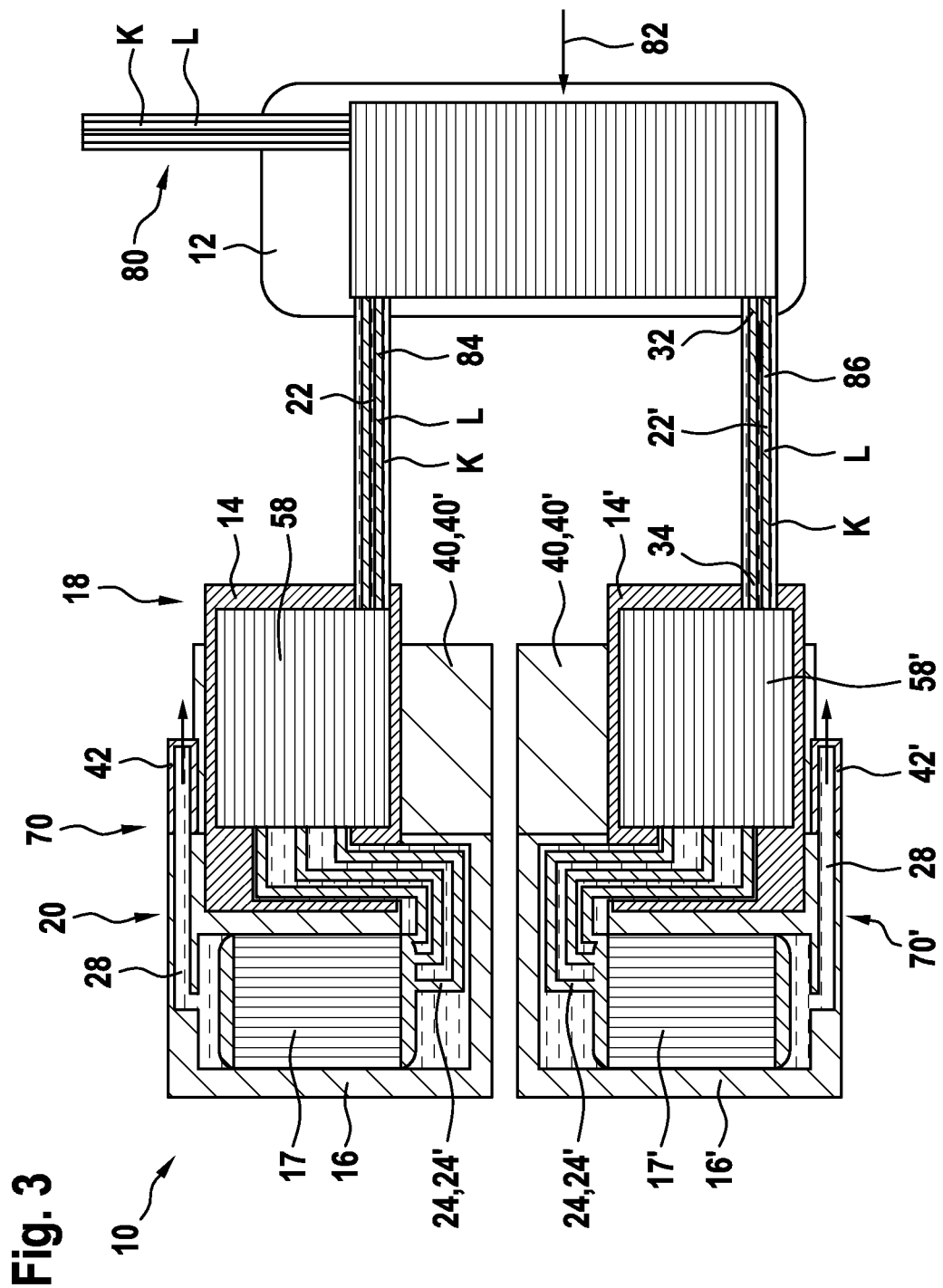
FIG. 3 shows a configuration of the drive system having a plurality of drive modules, and
FIG. 4 schematically illustrates a cooling circuit with switching valves and bypass lines.

FIG. 3 shows a configuration of the drive system 10 in which the drive system 10 has two inverters 14, 14', two electric machines 16, 16' and two gear mechanisms 40, 40' having a gear mechanism heat exchanger 42, 42', wherein in each case one inverter 14, 14', one electric machine 16, 16' and one gear mechanism 40, 40' having a gear mechanism heat exchanger 42, 42' are combined to form a drive module 70, 70'. The drive system 10 therefore has two drive modules 70, 70', by way of which individual wheel drive can be realized.

In the example, both drive modules 70, 70' are supplied with electrical energy by way of the traction battery 12. In the example, a charging line 80, which electrically connects the traction battery 12 to a charging socket on the electric vehicle 100, is connected to the traction battery 12. The charging line 80 is connected to the cooling circuit 26 in order to be cooled accordingly. The charging line 80 has a current-conducting or power-conducting line core L and a channel section K for the cooling medium 28.

The cooling medium 28 enters the traction battery 12 at an entry 82 (for example coming from the heat exchanger 36), flows through said traction battery and is then divided into two substreams 84, 86, wherein each substream 84, 86 is fed to a drive module 70, 70'.

The high-voltage connecting elements 22, 22', which each have a current-conducting or power-conducting line core L and a channel section K for the cooling medium 28, electrically and fluidically connect the traction battery 12 to the inverter 14, 14' (DC voltage side 18).

Each substream 84, 86 flows through a respective drive module 70, 70', wherein in each case the cooling medium 28 passes through the inverter 14, 14', the electric machine 16, 16' and the gear mechanism heat exchanger 42, 42'. In the inverter 14, 14', the cooling medium 28 flows through a respective cooling geometry 58, 58'.

The high-voltage connecting elements 24, 24', which each electrically connect the inverter 14, 14' to the electric machine 16, 16', are formed on the AC voltage side 20 by means of busbars. There, the cooling medium 28 is also transferred to the electric machine 16 in which the cooling medium 28 is used to cool the stator 17, 17'.

Subsequently, the cooling medium 28 leaves the electric machine 16, 16' and is fed in each case to the gear mechanism heat exchanger 42, 42' of a gear mechanism 40, 40'. After passing through the gear mechanism heat exchanger 42, 42', the two substreams 84, 86 of the cooling circuit 26 can where necessary be combined to form one stream and be fed back to the heat exchanger 36.

Figure 4:
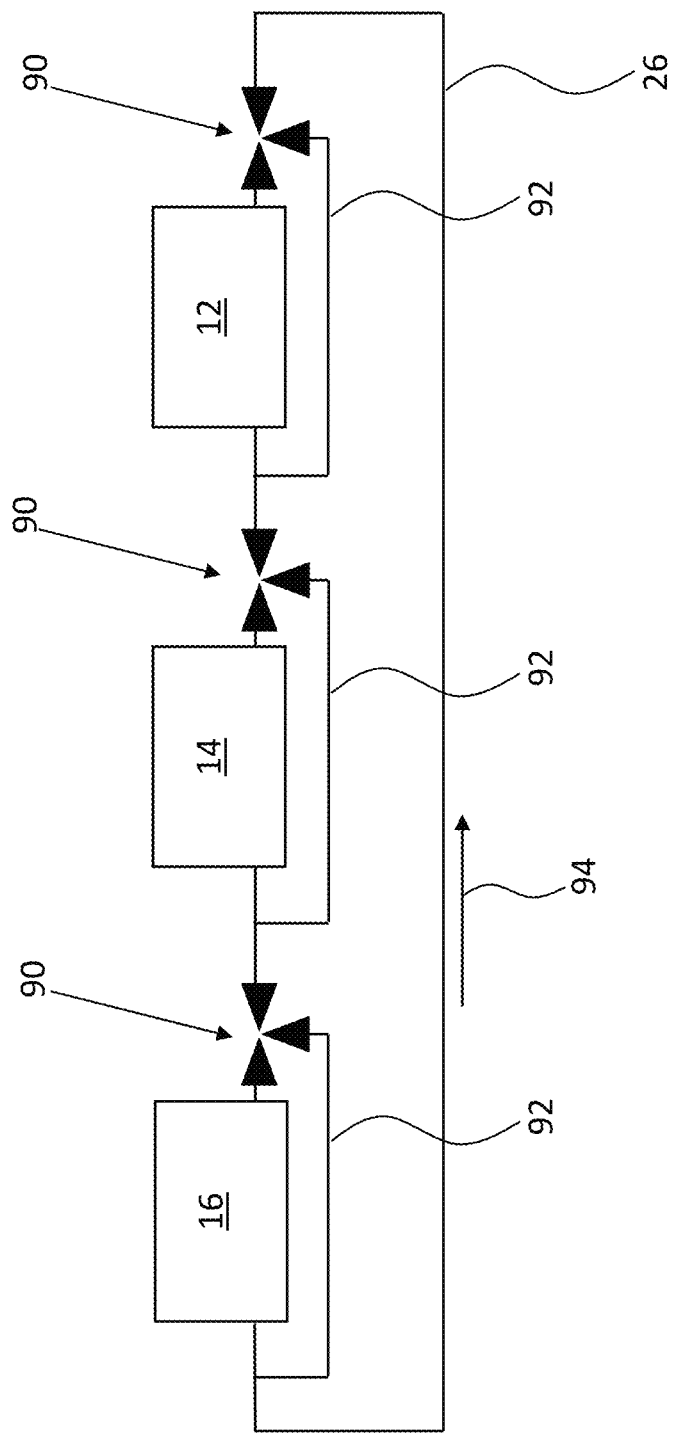

As explained above, one, several or all of the drive components can be connected to the cooling circuit 26 in each case by means of a controllable switching valve 90, as shown in FIG. 4. The respective drive components 12, 14, 16 can thus be connected to the cooling circuit 26 or disconnected from the cooling circuit 26 depending on the cooling requirement. A bypass line 92, which is able to be fluidically connected to the cooling circuit 26, can be provided in each case at the drive components 12, 14, 16. When the switching valve 90 at one of the drive components 12, 14, 16 is closed, for example, the cooling circuit 26 can then bypass said drive component 12, 14, 16 and for example flow through a drive component which follows in the direction of flow 94. FIG. 4 is understood to be a schematic representation only, and does not show the precise or relative size, proportions, or dimensions of features illustrated therein.

Optionally, one or more heat exchanging devices are provided, wherein in each case a first side of the heat exchanging device is integrated in the cooling circuit 26 and a second side of the heat exchanging device has a heat output connection for outputting heat energy. The waste heat of one or more drive components can therefore be used to heat the vehicle interior.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A drive system for an electric vehicle, comprising:
   drive components, comprising:
   a traction battery;
   an inverter; and
   an electric machine,
   wherein the traction battery is electrically connected to the electric machine by the inverter,
   wherein the traction battery is electrically connected to the inverter and the inverter is electrically connected to the electric machine in each case by high-voltage connecting elements,
   wherein the drive system has a cooling circuit configured to cool the drive components by a cooling medium,
   wherein the drive components and the high-voltage connecting elements are each configured so as to convey the cooling medium and form a part of the cooling circuit, wherein the high-voltage connecting elements each comprise line cores, wherein the high-voltage connecting elements each have a sheathing, which surrounds an outside of respective line cores such that the cooling medium flows around the respective line cores directly, wherein the line cores are configured to be cooled by the cooling medium by direct cooling such that the cooling medium directly contacts the line cores, wherein a channel section in which the cooling medium is conveyed is formed in an intermediate space between the sheathing and the line cores, wherein the inverter has a housing with a top closure cover, wherein the inverter has a cooling geometry arranged within the housing and top closure cover, wherein the cooling medium is configured to flow through the cooling geometry, wherein the cooling medium is configured to flow away from the line cores towards the top closure cover, and wherein the top closure cover is configured to direct the cooling medium through the cooling geometry.

2. The drive system of claim 1, wherein the drive components and the high-voltage connecting elements each have a connection interface configured to couple the drive component to the high-voltage connecting element, and
wherein the connection interface in each case has an electrical connection and a fluid connection.

3. The drive system of claim 1, wherein a portion of the drive components or all of the drive components are configured to be cooled by the cooling medium by direct cooling.

4. The drive system of claim 1, further comprising:
a heat exchanger configured to control a temperature of the cooling medium, the heat exchanger being connected upstream of the traction battery in the cooling circuit.

5. The drive system of claim 1, wherein the drive system has at least one gear mechanism coupled to the electric machine as a further drive component, and
wherein the gear mechanism has a gear mechanism heat exchanger and the gear mechanism heat exchanger is integrated in the cooling circuit.

6. The drive system of claim 5, wherein the drive system has at least two inverters, at least two electric machines, and at least two gear mechanisms having a gear mechanism heat exchanger, and
wherein, in each case, one inverter, one electric machine, and one gear mechanism having a gear mechanism heat exchanger are combined to form a drive module.

7. The drive system of claim 1, further comprising:
a pump configured to convey the cooling medium, the pump being connected upstream of the traction battery in the cooling circuit and/or a pump configured to convey the cooling medium being connected upstream of the electric machine in the cooling circuit.

8. The drive system of claim 1, wherein the cooling circuit comprises an only cooling circuit of the drive system, and/or wherein the cooling circuit has only one single cooling medium.

9. The drive system of claim 1, wherein one, several, or all of the drive components are each connected to the cooling circuit by a controllable switching valve.

10. The drive system of claim 1, further comprising:
one or more heat exchanging devices,
wherein, in each case, a first side of the heat exchanging device is integrated in the cooling circuit and a second side of the heat exchanging device has a heat output connection configured to output heat energy.

11. The drive system of claim 1, wherein the intermediate space fully surrounds the high-voltage connecting element.

12. The drive system of claim 1, wherein each of the traction battery, the inverter, and the electric machine include a controllable switching valve and are connected to the cooling circuit by a respective controllable switching valve.

13. The drive system of claim 12, further comprising a bypass line that is fluidly connected to the cooling circuit such that when one or more of the controllable switching valves are closed, coolant flowing through the cooling circuit flows through the bypass line without flowing through one or more of the traction battery, inverter, and electric machine.

14. The drive system of claim 1, wherein the cooling geometry comprises a carrier plate and/or electrical components of active parts of the inverter.

15. A drive system, comprising:
an inverter;
an electric machine;
a first high-voltage connecting element comprising line cores and a sheathing surrounding an outside of the line cores such that a cooling medium is conveyed by the high-voltage connecting element between the line cores and the sheathing and flows around the line cores directly, the line cores being configured to be cooled by the cooling medium by direct cooling such that the cooling medium directly contacts the line cores; and
a second high-voltage connecting element comprising a busbar configured to be cooled by the cooling medium by direct cooling,
wherein the first high-voltage connecting element, the inverter, the second high-voltage connecting element, and the electric machine form a contiguous portion of a cooling circuit through which the cooling medium is conveyed from the first high-voltage connecting element to the electric machine,
wherein the inverter has a housing with a top closure cover,
wherein the inverter has a cooling geometry arranged within the housing and top closure cover,
wherein the cooling medium is configured to flow through the cooling geometry,
wherein the cooling medium is configured to flow away from the line cores towards the top closure cover, and
wherein the top closure cover is configured to direct the cooling medium through the cooling geometry toward the second high-voltage connecting element.

16. The drive system of claim 15, wherein a fluid connection arranged between the electric machine and the second high-voltage connecting element is configured to direct the cooling fluid from the inverter to the electric machine, and wherein a gear mechanism heat exchanger is arranged downstream of the electric drive machine relative to a flow direction of the cooling medium through the contiguous portion of the cooling circuit.

* * * * *